(12) United States Patent
Sahinoglu

(10) Patent No.: US 6,885,969 B2
(45) Date of Patent: Apr. 26, 2005

(54) LOCATION ESTIMATION IN PARTIALLY SYNCHRONIZED NETWORKS

(75) Inventor: Zafer Sahinoglu, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/649,759

(22) Filed: Aug. 26, 2003

(65) Prior Publication Data

US 2005/0049821 A1 Mar. 3, 2005

(51) Int. Cl.$^7$ .......................... G06F 15/00; G01C 17/00
(52) U.S. Cl. .................. 702/150; 702/95; 702/153; 702/158; 702/189
(58) Field of Search .................. 702/94, 95, 149, 702/150, 153, 158, 188, 189; 455/456.1, 456.2, 457, 525, 561; 342/357.06, 387, 465

(56) References Cited

U.S. PATENT DOCUMENTS

| | | | | |
|---|---|---|---|---|
| 6,728,545 | B1 * | 4/2004 | Belcea ..................... | 455/456.2 |
| 2002/0180640 | A1 | 12/2002 | Gilkes et al. ............... | 342/387 |
| 2004/0005902 | A1 * | 1/2004 | Belcea ........................ | 455/502 |
| 2004/0017775 | A1 * | 1/2004 | Omae et al. ................ | 370/235 |

OTHER PUBLICATIONS

J. H. Reed, K. J. Krizman, B. D. Woerner, T. S. Rappaport, "An overview of the challenges and progress in meeting the E–911 requirement for location service," IEEE Communications Magazine, pp. 30–37, Apr. 1998.

A. Ward, A. H. A Jones, "A new location technique for the active office," IEEE Personal Communications, v:4, n:5, pp. 42–47, Oct. 1997.

J. Werb, C. Lanzl, "Designing a positioning system for finding things and people indoors," IEEE Spectrum, v:35, n:9, pp. 71–78, Sep. 1998.

N. Patwari, A. O. Hero, M. Perkins, N. S. Correal, R. J. O'Dea, "Relative Location Estimation in Wireless Sensor Networks," to appear in IEEE Trans. Signal Processing, 2003.

* cited by examiner

*Primary Examiner*—Bryan Bui
(74) *Attorney, Agent, or Firm*—Dirk Brinkman; Andrew J. Curtin

(57) ABSTRACT

A method locates a mobile node in a partially synchronized wireless network comprised of nodes with heterogeneous communication ranges. The time intervals it takes for messages to travel from stationary nodes at known location to a mobile node at an unknown location are measured and used to determine a set of possible coordinates of the mobile node. This time-based set of coordinates is in the form of a hyperbolic function. The received signal strengths of a message received from the mobile node is measured in two additional stationary nodes at known location. These RSS-based measurements provide two more sets of possible coordinates of the mobile node. The three sets are then intersected to estimate the location of the mobile node.

8 Claims, 3 Drawing Sheets

LOCATION ESTIMATION IN PARTIALLY SYNCHRONIZED NETWORKS

FIELD OF THE INVENTION

The invention relates generally to determining locations of wireless communication devices in a communication network, and more particularly to locating mobile devices in a network lacking globally synchronized timing signals.

BACKGROUND OF THE INVENTION

Wireless communications networks and devices are becoming smaller and smaller. For example, in piconets, the radio range of Bluetooth devices is ten meters or less. Typically, the devices operate without any centralized infrastructure. Nodes enter and exit the network at will, and the network topology is ad hoc.

Another example is a wireless sensor network. Sensor networks are also used to monitor factory operation, vehicle operation, the environment, and public structures such as bridges and tunnels. Recently, the University of California, Berkeley and Intel Berkeley Research Lab demonstrated a self-organizing wireless sensor network including over 800 low-power sensor nodes, each the size of a coin, dispersed over the university campus.

When the sensors are mobile, it is important to know the location of the devices, so that the sensed data can be correlated to specific places.

A number of techniques are known for determining locations of wireless communication devices (nodes) in a network such as cellular telephone networks, global and local positioning systems (GPS and LPS), and sensor networks.

Time of Arrival (TOA): This method uses trilateration to determine positions of mobile nodes. Position estimation by trilateration is based on knowing distances from the mobile node to at least three known locations, e.g., base stations or satellites. To obtain accurate timing from which the distances can be computed, the mobile node has to communicate directly with the base station, and exact timing information is also required at all nodes. The radio range of transceivers of many wireless sensor nodes is very short, e.g., less than ten meters. Therefore, to be able to use TOA, the density of the base stations becomes so high the TOA solution is impractical.

Time difference of arrival (TDOA): In this method, time delay estimations are used to determine a time difference of arrival of acknowledgement signals from mobile nodes to the base stations. The TDOA estimates are used to determine range difference measurements between base stations. By solving non-linear hyperbolic function, estimates of location can be obtained.

Received Signal Strength (RSS): Here, the mobile node applies trilateration to signal strength measurements obtained from signals received from at least three stationary position nodes. However, RSS measurements increase the complexity of the sensor nodes. In addition, location estimates based on RSS are coarse due to environmental factors such as multi-path and shadowing.

Location estimation methods for cellular telephone networks are described by P. C. Chen, "A non-line of sight error mitigation algorithm in location estimation," IEEE Wireless Communications and Networking Conference," pp. 316–320, September 1999, J. H. Reed, K. J. Krizman, B. D. Woerner, T. S. Rappaport, "An overview of the challenges and progress in meeting the E-911 requirement for location service," IEEE Communications Magazine, pp. 30–37, April 1998, and M. A. Spirito, "On the accuracy of cellular mobile station location estimation," IEEE Trans. Vehicular Technology, v:50, n:3, pp. 674–685, May 2001.

Local positioning systems are described by A. Ward, A. H. A Jones, "A new location technique for the active office,"IEEE Personal Communications, v:4, n:5, pp. 4247, October 1997, and J. Werb, C. Lanzl, "Designing a positioning system for finding things and people indoors," IEEE Spectrum, v:35, n:9, pp. 71–78, September 1998. Local positioning systems can use TOA, TDOA, and RSS, as described above.

What distinguishes location estimation in sensor networks from cellular and local positioning techniques is that sensor nodes have very short radio ranges, as short as one meter or less, and no global synchronization. Therefore, the methods known for cellular networks and local positioning systems are of no use to sensor networks.

One solution is to provide some of the sensor nodes with location coordinates, see, Patwari, et al., "*Relative Location Estimation in Wireless Sensor Networks,*" to appear in IEEE Trans. Signal Processing, 2003. They have the sensors estimate ranges between neighboring nodes. With TOA and RSS, they can estimate sensor locations with about 1.5 meter accuracy by averaging RSS measurements over frequency to reduce frequency selective fading error. However, their method requires a stationary network, and does not admit mobile nodes.

Another solution relies on TDOA measurements derived from signals received from at least three transmitters, Gustafsson et al., "*Positioning Using Time Difference of Arrival Measurements.*" ICASSP, Hong Kong, PRC, 2003. They use a non-linear least squares fit approach, which enables local analysis yielding a position covariance and a Cramer-Rao lower bound. However, they require a globally synchronized network. That is not practical for sensor networks.

Phase Difference: Another technique measures a phase difference between a stable reference signal and a wireless mobile signal at several known locations. The location of the wireless mobile device is then determined from the phase difference information, see U.S. Published Patent Application 20020180640, "Location estimation in narrow bandwidth wireless communication systems," by Gilkes et al., Dec. 5, 2002.

In their approach, the mobile nodes embed 1 MHz pilot signals into request messages for obtaining a position fix. Each message also carries a unique node identification and sequence number. A fixed reference station transmits a reference pilot signal. Other stationary nodes in the network measure a phase difference between the pilot signal in the request message and the reference pilot signal. The header information is processed at the reference station to track location of the mobile node. Their approach requires so-called "equipped location marker" nodes to be synchronized with the reference station, e.g., Bluetooth master node, and among themselves, e.g., Bluetooth slave nodes.

Bluetooth communication systems provide synchronized time slot sharing. Otherwise, message arrivals include offset values. These offset values induce error in relative time arrival. Therefore, that system is not applicable to sensor networks lacking synchronization. Also, their method induces high computational complexity in Bluetooth equipped location marker nodes, minimally a phase comparator and a phase difference and averaging circuit.

Therefore, it is desired to estimate locations of mobile nodes in a network of nodes lacking global synchronization, without increasing the complexity of the mobile nodes.

SUMMARY OF THE INVENTION

A method and system locates a mobile node in a partially synchronized wireless network. In particular, the mobile nodes are low complexity sensors lacking time synchronization and means to measure signal strength. In order to have a tracking system with a minimum number of synchronized known location nodes, such nodes are given longer communication range capability, e.g., greater than 100 meters, than the mobile nodes, e.g., 30 meters. Therefore, mobile nodes can receive signals from longer-range nodes directly. However, the mobile nodes have to send messages to longer range nodes in a multi-hop manner. This invention describes a tracking system for such a network with largely varying communication ranges.

The time intervals it takes for messages to travel from long communication range stationary nodes at known locations to a much shorter communication range mobile nodes at an unknown locations are measured and used to determine a set of possible coordinates of the mobile node. This time-based set of coordinates is in the form of a hyperbolic function.

Besides, the received signal strengths of a message received from the mobile node is measured in two additional stationary nodes at known location. These RSS-based measurements provide two more sets of possible coordinates of the mobile node.

The three sets are then intersected to estimate the location of the mobile node.

DETAILED DESCRIPTION OF THE PREFERRED EMBODIMENT

System Structure

My invention provides location estimation for mobile nodes in a wireless communication network lacking global synchronization. As a characteristic, the nodes for which locations are to be estimated are mobile, low-complexity, low-power, unsynchronized, and have a relatively short radio range, e.g., in the order of meters.

Figure 1:
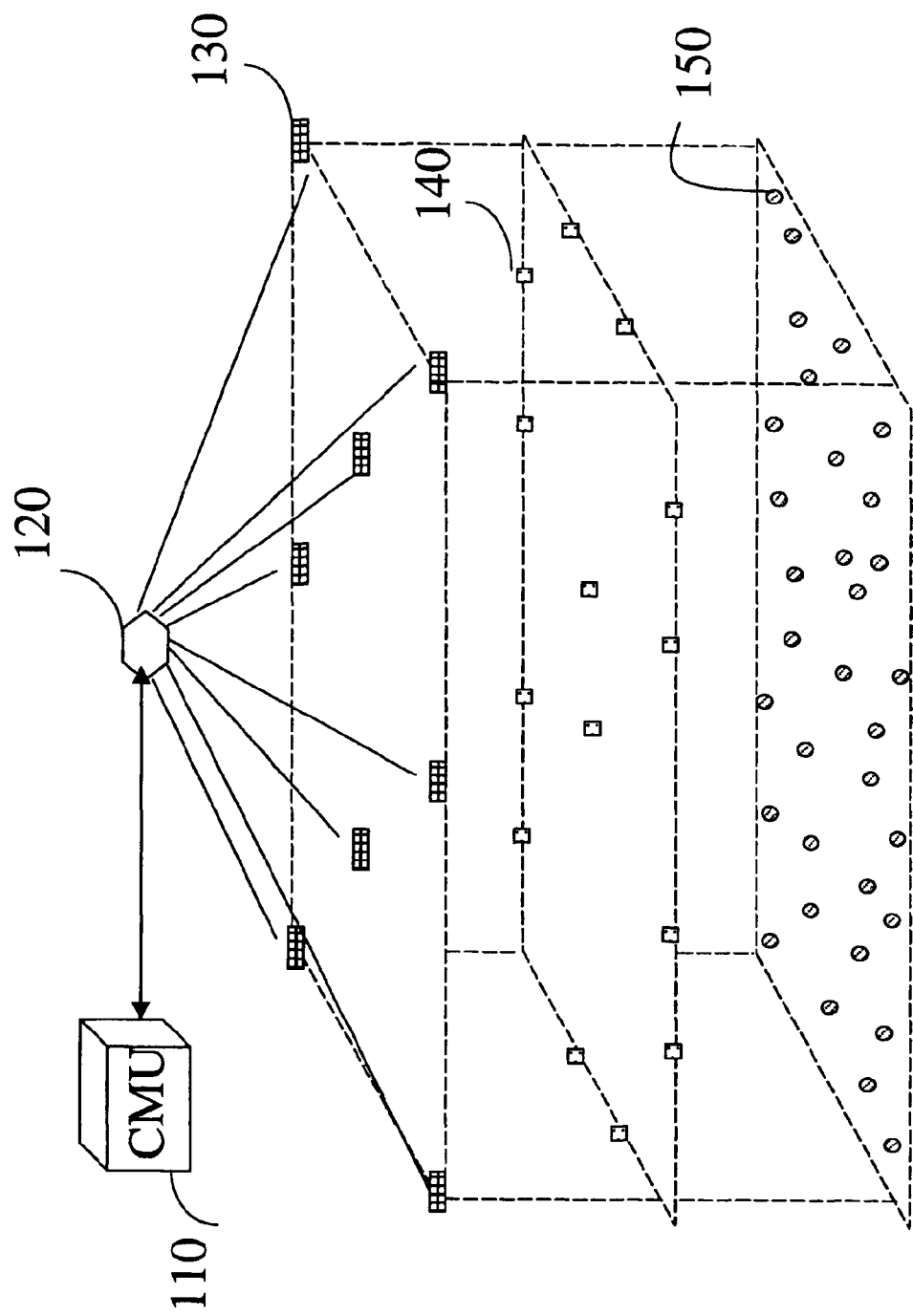
FIG. 1 is a diagram of a sensor network including a plurality of nodes according to the invention.

As shown in FIG. 1, my network has four types of nodes. Each node has a unique identification (ID). Each node can send and receive messages. Each message from a particular node has a sequence number (SN), thus any ID-SN uniquely identifies the node and the message. Only the position nodes have access to synchronized timing information.

The levels in FIG. 1 only indicate a hierarchy of the nodes for the purpose of this description. It should be understood that the nodes can be intermingled in a 3D environment in an arbitrary manner.

Position nodes 130 are stationary at known locations. Position nodes are time synchronized among themselves and have access to timing information to generate time stamps (TS). Time stamps are added to messages when they are transmitted. The communication range of the position nodes is in the order of about 100 meters.

Router nodes 140 are also stationary at known locations. Router nodes are configured to route messages between nodes, and to detect the signal strength of received messages. The router nodes have a shorter radio range than position nodes, and lack time synchronization.

Mobile nodes 150 are simple devices with a very short range radio. Mobile nodes are configured to receive, transmit, and process messages. In the preferred embodiment, the nodes sense data. Mobile nodes, like router nodes, lack time synchronization.

Gateway nodes 120 communicate message between the nodes and a central monitoring unit (CMU) 110. The central monitoring unit controls the overall operation of the network. It should be noted that the gateway and central monitoring functions can be combined into a single processing unit.

System Operation

Figure 2:
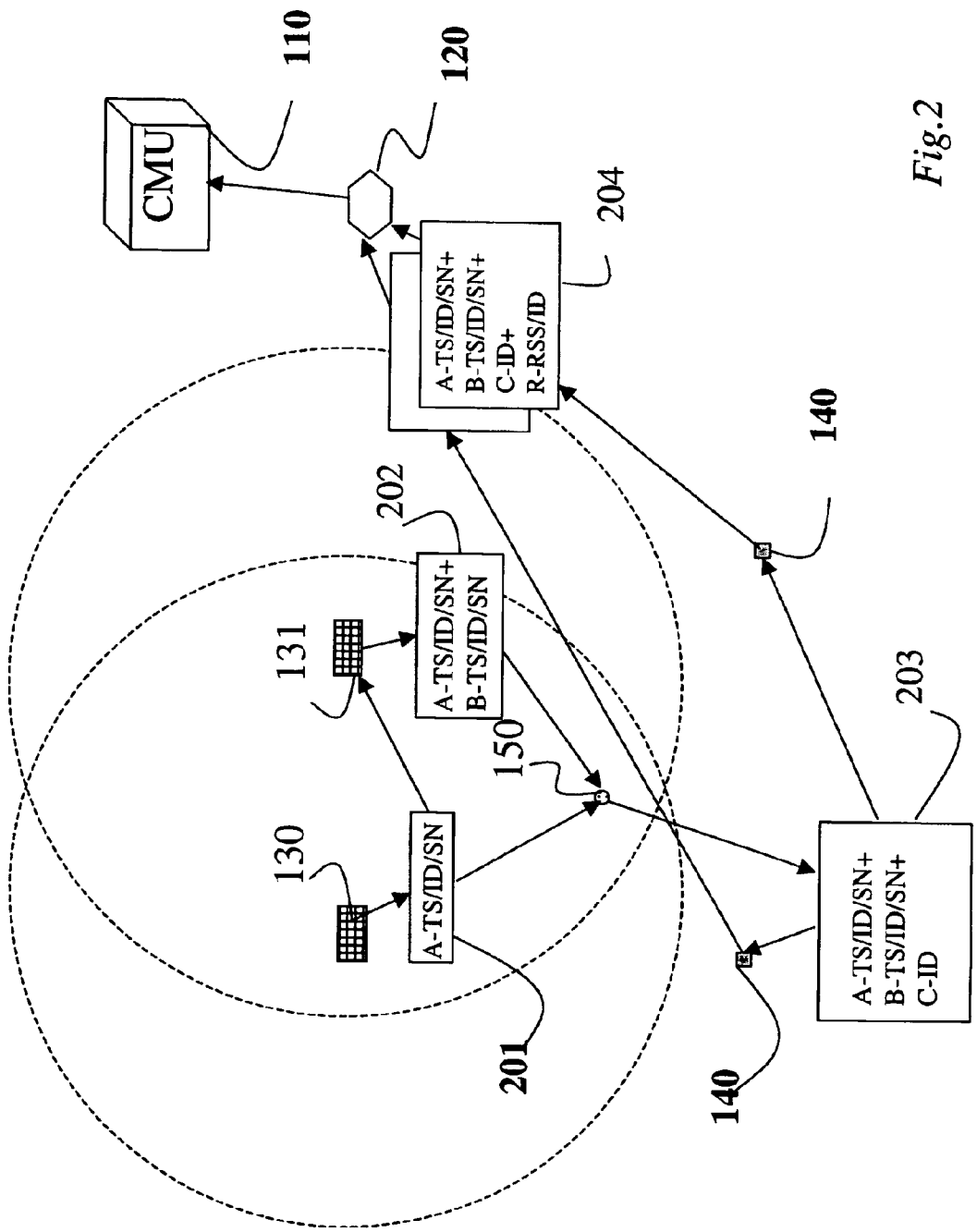
FIG. 2 is a block diagram of messages transmitted among the nodes according to the invention.

FIG. 2 shows the operation of the invented method. A request for a location fix of a mobile node can be initiated by any node in the network by broadcasting a located request message. This message includes an ID of the mobile node to be located. The locate request can originate from a mobile node desiring to locate itself.

The request message is received by a position node. Typically, the position node nearest the mobile node to be located is first to respond. The position can be based on the last known location of the mobile node.

In response to receiving the located request message, position node A 130 broadcasts a message 201. The message 201 includes the following information, time of transmission, node identification, and message sequence number (A-TS/ID/SN). The message is received by position node B 131 and mobile node C 150. Both nodes are within radio coverage of position node 130.

Node 131 broadcasts a message 202 as (A-TS/ID/SN+B-TS/ID/SN) also received by the mobile node C 150.

The mobile node then broadcasts a message (A-TS/ID/SN+B-TS/ID/SN+C-ID) 203, which is received by at least two neighboring router nodes 140. Each router node $R_i$ 140 measures the RSS of message 203, and broadcasts a message ((A-TS/ID/SN+B-TS/ID/SN+C-ID+$R_i$-RSS/ID) 204.

Measuring the RSS in the router nodes simplifies the design of mobile nodes. Messages 204 are received by the gateway node 120, and forwarded to the CMU 110.

Based on the timing information and the received signal strength the location of the mobile node 150 can be determined as follows. The location fix can be either in 2D or in 3D.

Location Estimation

To estimate the location of the mobile node 150, the following definitions are used:

$t_A$: time of departure of message from node A,
$t_B$: time of departure of message from node B,
$td_{AB}$: time interval for message to travel from node A to node B, which is $t_B - t_A - t_{PB}$, where the term $t_{PB}$ is a processing delay in node B,
$td_{AC}$: time interval for message to travel from node A to node C,
$td_{BC}$: time interval for message to travel from node B to node C,
$t_{AC_{OFF}}$: time-offset between node A and node C;
$t_{BC_{OFF}}$: time-offset between node B and node C;
$d_{AC}$: distance between node A and node C,
$d_{CB}$: distance between node B and node C,
$d_{AB}$: distance between node A and node B.

The CMU knows the location of position node A 130 and position node B 131. Position node B 131 can measure its internal delay $t_{PB}$. The router nodes 140 can measure the RSS of message 203. Therefore, it is possible to determine a distance difference ($d_{AC} - d_{CB}$).

The CMU 110 parses the messages 204 and determines sets of possible locations (coordinates) for mobile node C 150. These possible locations have to satisfy the constraint:

$$d_{BC} - d_{AC} = (t_{d_{BC}} - t_{d_{AC}}) * \text{speed\_of\_radio\_signal.} \quad (1)$$

Figure 3:
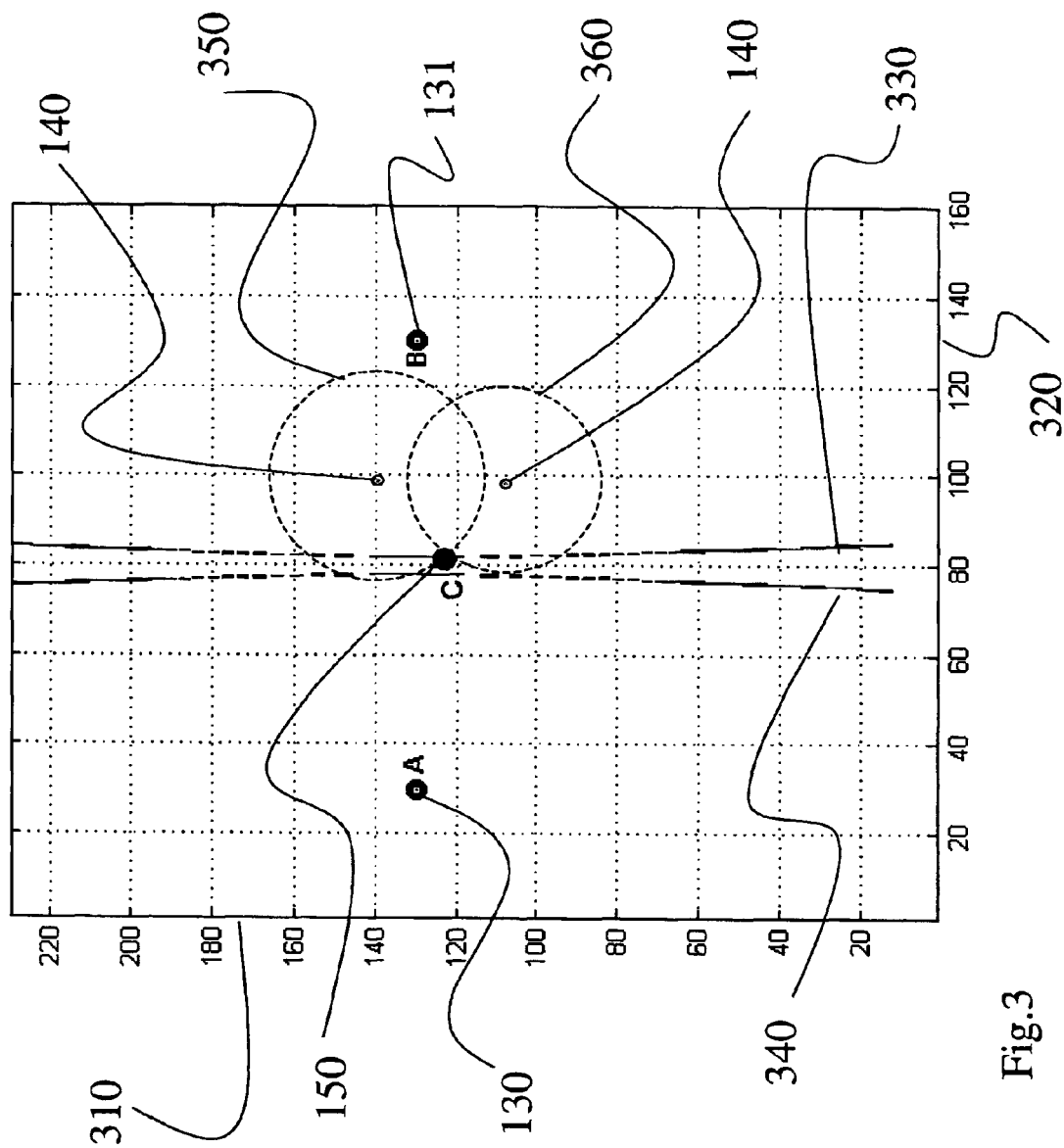
FIG. 3 is a graph of a unique solution for estimating a location of a mobile node according to the invention.

As shown in FIG. 3, the solution set of the constraint expressed by equation (1) includes two symmetric hyperbolic functions 330 and 340 that express a set of possible location coordinates.

In order to obtain a solution set with coordinates of a single location, additional information is acquired from the RSS in messages 204, which are measured in the neighboring router nodes 140.

FIG. 3 shows how the time-based measurements and the RSS-based measurement are combined to estimate the coordinates of the location of the mobile node C 150.

The vertical axis 310 and the horizontal axis 320 are in meters.

FIG. 3 also shows the position nodes A and B 130–131, and the mobile node C 150. The router nodes 140 are located at distances 350 and 360 from the mobile node 150. These RSS-based constraints provide an additional two sets of possible coordinates of the mobile node 150.

Equation 1 provides the two symmetric hyperbolic function. Each RSS measurement also defines circular functions that have the router node at the center and the mobile node at the edge. The intersection of the solutions sets of two such circular functions and hyperbolic functions coincide with the estimated coordinates of the mobile node 150.

There is a unique solution for the intersection of equation (1) and at least two RSS measurements from the router nodes 140.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for locating a mobile node in a partially synchronized wireless network, comprising:

measuring a first time interval to transmit a first message from a first stationary node at a first known location to a mobile node at an unknown location;

measuring a second time interval to transmit a second message from a second stationary node at a second known location to the mobile node, in which the first stationary node is time synchronized with the second stationary node;

broadcasting, from the mobile node, a third message to a third stationary node at third known location and a fourth stationary node at fourth known location:

measuring a first received signal strength of the third message at the third stationary node;

measuring a second received signal strength of the third message at the fourth stationary node;

determining a first set of possible coordinates of the mobile node from the first time interval and the second time interval;

determining a second set of possible coordinates of the mobile node from the first received signal strength;

determining a third set of possible coordinates of the mobile node from the second received signal strength; and intersecting the first, second and third sets of possible coordinates of the mobile node to estimate a location of the mobile node.

2. The method of claim 1, in which each node includes a unique identification, and each message includes a unique serial number.

3. The method of claim 1, in which the mobile nodes are sensor nodes in an ad hoc wireless network.

4. The method of claim 1, in which the messages are transmitted in response to a locate request message identifying the mobile node.

5. The method of claim 1, in which the first set of possible coordinates is a solution set of a hyperbolic function.

6. The method of claim 1, in which the first and second set of possible coordinates are solution sets of circular functions.

7. The method of claim 1, in which a communication rage of the mobile node is substantially less than a transmit communication range of the stationary nodes.

8. A system for locating a mobile node in a partially synchronized wireless network, comprising:

a mobile node at an unknown location configured to obtain a first time interval to transmit a first message from a first stationary node at a first known location to the mobile node and a second time interval to transmit a second message from a second stationary node at a second known location to the mobile node, in which the first stationary node is time synchronized with the second stationary node, and further configured to broadcast a third message to a third stationary node at a third location and a fourth stationary node at a fourth known location;

a third stationary node at a third known location configured to measure a first received signal strength of a third message broadcast by the mobile node;

a fourth stationary node at a fourth known location configured to measure a second received signal strength of the third message broadcast by the mobile node;

means for determining a first set of possible coordinates of the mobile node from the first time interval and the second time interval, a second set of possible coordinates of the mobile node from the first received signal strength, and a third set of possible coordinates of the mobile node from the second received signal strength; and means for intersecting the first, second and third sets of possible coordinates of the mobile node to estimate a location of the mobile node.

* * * * *